United States Patent [19]

Lässig et al.

[11] Patent Number: 4,597,475
[45] Date of Patent: Jul. 1, 1986

[54] UNIVERSALLY MOVABLE SUSPENSION MEMBER

[75] Inventors: Martin Lässig, Kiel; Ulf Bey, Grossharrie, both of Fed. Rep. of Germany

[73] Assignee: Anschütz & Co. GmbH, Eil, Fed. Rep. of Germany

[21] Appl. No.: 525,051

[22] PCT Filed: Dec. 11, 1982

[86] PCT No.: PCT/DE82/00231
  § 371 Date: Jul. 21, 1983
  § 102(e) Date: Jul. 21, 1983

[87] PCT Pub. No.: WO83/02155
  PCT Pub. Date: Jun. 23, 1983

[30] Foreign Application Priority Data

Dec. 12, 1981 [DE] Fed. Rep. of Germany ....... 3149326

[51] Int. Cl.⁴ ................................................ F16F 9/10
[52] U.S. Cl. ..................... 188/378; 33/346; 74/5.5; 92/35; 92/41; 248/638; 267/122; 285/227; 403/50
[58] Field of Search .............. 188/378, 379, 266, 380, 188/272, 366, 298; 267/64.19, 64.23, 64.27, 140.1, 122, 140.4, 140.5, 141.2, 141.6; 285/227, 228, 226; 403/50, 51; 277/200, 212 FB; 92/35, 37, 42, 41, 34; 248/636, 562; 249/612, 638; 74/5.5, 18.1, 18.2; 33/346

[56] References Cited

U.S. PATENT DOCUMENTS

| 2,842,358 | 7/1958 | Nardi ........................ 267/35 |
| 3,002,741 | 10/1961 | Akutowicz ................ 267/8 R |
| 3,530,770 | 9/1970 | McMurray ................... 92/42 |
| 3,545,231 | 12/1970 | Downey . | |
| 3,722,875 | 3/1973 | Hasse ........................ 267/122 |
| 3,834,741 | 9/1974 | Drake ......................... 285/226 |

FOREIGN PATENT DOCUMENTS

| 2259853 | 12/1971 | Fed. Rep. of Germany . | |
| 3011727 | 10/1981 | Fed. Rep. of Germany . | |
| 792738 | 1/1936 | France ....................... 267/35 |
| 2311226 | 12/1976 | France ..................... 188/298 |
| 2376311 | 7/1978 | France . | |
| 2471525 | 6/1981 | France . | |
| 0156953 | 11/1979 | Japan ..................... 267/64.27 |
| 0727907 | 4/1980 | U.S.S.R. .................. 188/378 |
| 0783516 | 11/1980 | U.S.S.R. ................ 267/64.27 |
| 1025935 | 6/1983 | U.S.S.R. ................ 267/64.23 |

OTHER PUBLICATIONS

The Marine Engineer and Naval Architect, vol. 84, No. 1023, Aug. 1961, Maidstone (GB) "A New Plath Gyro Compass", p. 1000, (C. Plath).
Product Engineering (General Electric Co.) Jul. 1954, "High-Viscosity Silicone Fluids for Mechanical Applications", (Dugan).

*Primary Examiner*—Duane A. Reger
*Assistant Examiner*—Michael P. Gilday
*Attorney, Agent, or Firm*—Shlesinger, Fitzsimmons & Shlesinger

[57] ABSTRACT

The invention relates to a universally movable suspension member for a direction indicating display system, especially for a gyro system (2), in which a bellows unit (1) is provided between a revolving disk (3) and the gyro system (2). The suspension member is designed as a double-bellows unit including two oppositely folded bellows (5, 6) so that, while a reliable and accurate indication is obtained, the volume of construction is decreased and the manufacturing costs are reduced.

7 Claims, 1 Drawing Figure

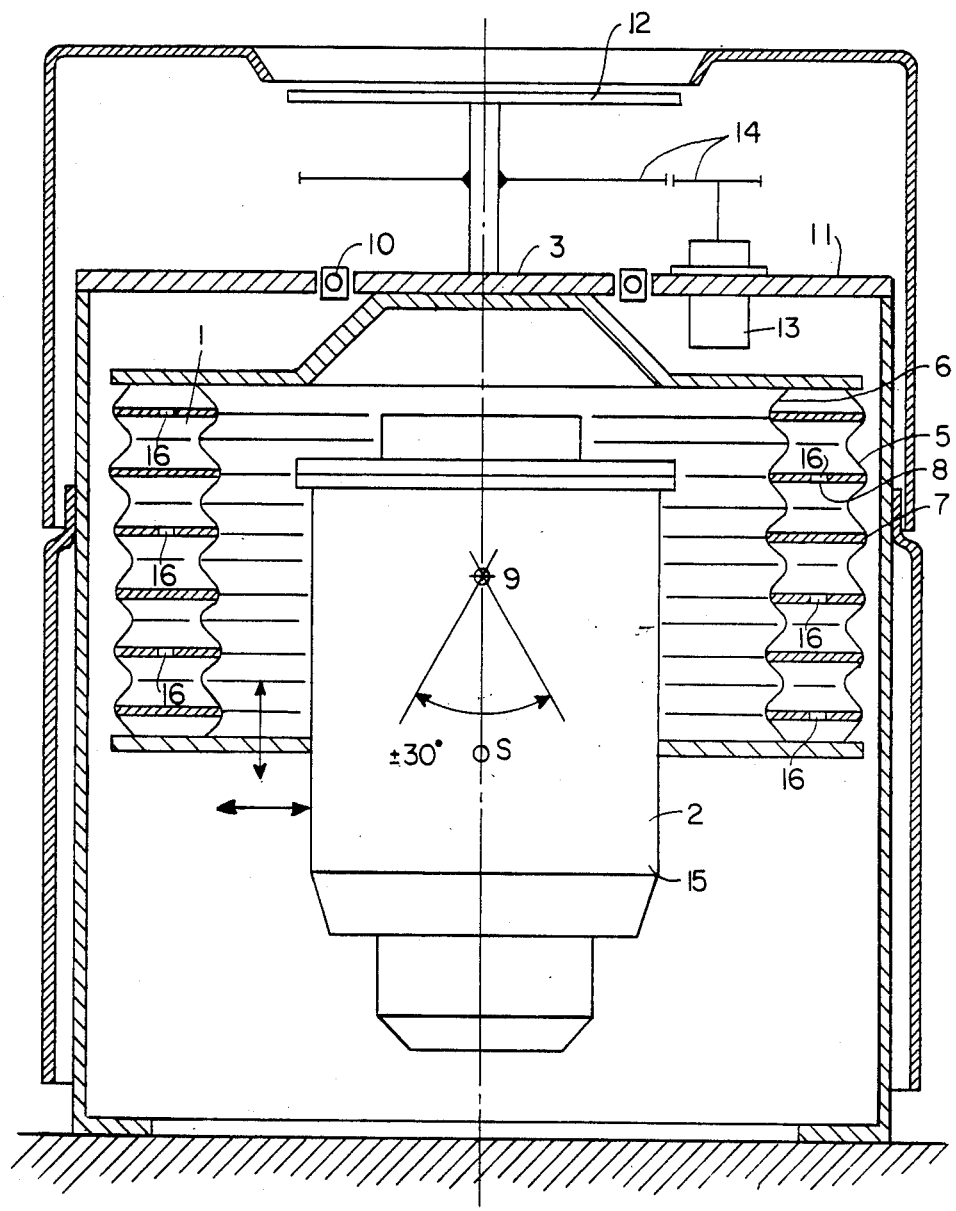

UNIVERSALLY MOVABLE SUSPENSION MEMBER

The invention relates to a universally movable suspension member, especially for a gyro system, in accordance with the preamble of claim 1.

Such a suspension member for gyro systems has been proposed in the German Patent Application No. P 30 11 727 for a gyro system. In said system, which is disclosed also in U.S. Pat. No. 4,376,726, the gyro system actually is not suspended from a bellows but from a pendulum mounted on a ball bearing in the revolving disk. To the upward extension of the pendulum there is mounted a body which is movable within a tank filled with a damping liquid. The mounting of the lower pendulum end to the gyro system is effected via a vibration absorbing spring system. Further a complex, ball-bearing supported horizontal shifting system is provided between the lower end of the pendulum and the gyro system. In this way a horizontal displacement of the gyro system is also possible.

The method described in the Patent Application No. 30 11 727 is relatively complex and therefore expensive. In particular the upwardly extending pendulum system requires a relatively large amount of space.

It is the object of the present invention to design a suspension member according to the preamble of claim 1 in such a way that the volume of construction is decreased and the manufacture is less expensive while a reliable and accurate indication is still obtained.

In accordance with the invention the above-specified object is solved by the features of the characterizing portion of claim 1. Further developments of the invention are set out in the subclaims.

A field of use resides in the implementation of the gimbal mounting required for magnetic compasses, repeater compasses and similar applications.

The preferred field of use, however, is that of suspending a gyro system from the revolving disk which is connected to the compass face and is rotatable relative to the ship's mounting structure. The elastic or spring properties cause restoring of the initial position without the action of external forces.

For such a use as pendulum joint the following requirements are satisfied at the same time:

a gimbal mounting, a decoupling from horizontal vibrations caused by the mounting to the ship's body, spring properties in vertical direction and thus resistance to vertical motions of the ship, a damping of pendulum-like oscillations upon rolling and pitching motions of the ship, the practically angle-error free transmission of torque during rolling and pitching motions of the ship.

In a preferred embodiment of the invention the internal diameter of the double bellows unit is selected to be sufficiently large so that the entire gyro system or a large part thereof, i.e., the eveloping sphere including the pump and the floating sphere, may be disposed in the interior free space. Thereby the following further advantages relative to known gyro systems are achieved:

The overall length and thus also the overall pendulum length are substantially reduced; the pendulum pivot of the double bellows unit is positioned between the upper third and half of the bellows length relative to the upper bellows suspension.

While there is the same axis of freedom of the suspension, the diameter and the length of the external casing may be kept smaller.

The number of parts required for the overall gyro system is decreased.

There are no mechanical parts subject to wear relative to the prior art, especially relative to the subject-matter of the German Patent Application No. P 30 11 727.

The overall system is considerably less expensive to manufacture.

Due to the configuration of the invention it is also possible to do without an additional damping system above the revolving disk and without a resilient damping system between pendulum suspension and gyro system. Also, no special means for a horizontal displacement of the gyro system have to be provided. Furthermore, a pendulum suspension means is also not required.

On account of this substantial simplification especially a number of parts subject to wear, such as ball bearings, compression springs, or roller bearings as horizontal displacement means, and also maintenance operations etc. will not be required.

An embodiment of the invention is shown in the drawing, in which

FIG. 1, the sole drawing FIGURE, shows a suspension member for a gyro system including a compass face and mounting means provided on the ship.

As shown in the drawing, the actual suspension member consists of the concentric double-bellows unit 1, the top and bottom of which are interconnected by a flexible, generally annular bellows section 7, including a plurality of axially spaced, outwardly directed bellows folds 5, and a like plurality of registering, inwardly directed bellows folds 6. The bellows section 7 is made of rubber, resilient metal, polytetrafluoroethylene or elastomeric plastics, and contains a damping liquid such as glycerin or, preferably, silicone fluid. A supporting ring 8, which is made up of brass, aluminum, plastics or plastics-reinforced fabric such as glass-fiber reinforced plastic material is disposed in the radial space between each pair of registering folds 5 and 6.

The top of the bellows is attached to the revolving disk 3, and the envelope ball 15 of the gyro system 2 including the scanning element is suspended from the bottom of the bellows 1. The free gyro system is disposed within within the elevelope ball 15.

9 indicates a pivot point. In case of motions of the ship such as rolling or pitching motions, the pivot point is approximately in this region in dependence on the material used, the dimensions and the range of application. In such cases the gyro system 2 will remain substantially perpendicular and stabilized while the upper suspension performs a pendulum-type motion about the pivot point. The centre of gravity S is indicated approximately at the juncture between gyro system 2 and the suspension member in the form of the double bellows unit 1. The suspension assembly permits pendulum motions of ±30 degrees, the twin arrows indicate a translational and a lateral shifting possibility.

For the rest, the revolving disk 3 is coupled to the ship's mounting structure 11 by means of a ball bearing 10. On the ship's mounting structure 11 there is provided a follow-up motor 13 for the compass face 12, said motor driving the compass face 12 via a follow-up system 14 preferably composed of gears and the like. For the rest, the follow-up motor 13 is controlled in the usual manner by the voltage deflections of the gyro system 2, which are picked off at the same (not shown). The thus readjusted compass card will reset by means of the bellows-type suspension assembly the envelope ball 15 mounted thereto in accordance with the gyro system 2 in response to the control signals applied to the follow-up motor 13.

The above-described structure comprises a number of specific features which result in the overall effect. By the disposition of the supporting rings 8 inside the bellows folds 7 the lowering of the bellows unit 1 is prevented to a large extent. A (desired) lowering will be possible only to the extent permitted by the flexible bellows material. In case of rolling and pitching motions of the ship the upper section of the suspension member will carry out a pendulum motion. Thereby the damping liquid will be compressed on one side of unit 1 and will flow through openings or bores 16 in the rings 8 to the opposite side. Thereby a damping of the suspension member is achieved. Moreover, the properties of the bellows permit a certain horizontal shifting of the suspension member while the provision of a costly horizontal shifting mechanism is not required. The damping effect will be obtained similarly in case of tensile strains and compressive loads. Finally, the bellows-type suspension also permits a highly effective damping of ship's vibrations.

The vibrations, which are transferred via the ship's body and the rigid ball bearing 10 to the top of the bellows-type suspension member 1, are damped by the bellows to such an extent that practically no vibrations are transferred to the gyro system 2 suspended thereabeneath.

We claim:

1. A universally movable suspension member for direction-indicating display systems, especially for a gyro system (2), in which the suspension member is disposed between a revolving disk (3) and the gyro system (2) to suspend the gyro system from the disk for pendulum type motion about a pivot point (9) spaced beneath said disk, and wherein the suspension member has the form of a concentric double-bellows unit (1) having a flexible bellows section (7) comprising a plurality of axially spaced pairs of registering, oppositely directed folds (5,6), wherein the space defined between said pairs of oppositely directed folds is filled with a damping liquid, and wherein a supporting ring (8) is dipsosed in the space between each pair of said registering folds.

2. A suspension member as claimed in claim 1, characterized in that the supporting rings (8) include throttling openings communicating with said liquid.

3. A suspension member as claimed in claim 1, characterized in that the flexible section (7) of the bellows unit (1) is made of a material selected from the group consisting of rubber, resilient metal, polytetrafluoroethylene and elastomeric plastics.

4. A suspension member as claimed in claim 1, characterized in that each supporting ring is made of a material selected from the group consisting of brass, aluminum, plastics and plastics-reinforced fabric.

5. A suspension member as claimed in claim 1, characterized in that the liquid in the double bellows unit is selected from the group consisting of glycerin and silicone fluid.

6. A suspension member as claimed in claim 1, wherein said flexible bellows section (7) is annular in configuration, and said gyro system (2) is enclosed in a housing (15) which is secured intermediate its ends in the bottom of said double-bellows unit (1) coaxially of said flexible bellows section (7).

7. A suspension member as claimed in claim 6, wherein the center of gravity (5) of said gyro system (2) registers approximately with the bottom of said double bellows unit (1).

* * * * *